US012587285B2

(12) United States Patent
Kagaya et al.

(10) Patent No.: US 12,587,285 B2
(45) Date of Patent: Mar. 24, 2026

(54) OPTICAL TRANSCEIVER

(71) Applicant: CIG Photonics Japan Limited,
Kanagawa (JP)

(72) Inventors: Osamu Kagaya, Tokyo (JP); Hiroyoshi Ishii, Yokohama (JP)

(73) Assignee: CIG PHOTONICS JAPAN LIMITED, Kanagawa (JP)

( * ) Notice: Subject to any disclaimer, the term of this patent is extended or adjusted under 35 U.S.C. 154(b) by 265 days.

(21) Appl. No.: 18/243,150

(22) Filed: Sep. 7, 2023

(65) Prior Publication Data

US 2024/0089011 A1 Mar. 14, 2024

(30) Foreign Application Priority Data

Sep. 12, 2022 (JP) ................................. 2022-144326

(51) Int. Cl.
*H04B 10/67* (2013.01)
*H04B 10/40* (2013.01)

(52) U.S. Cl.
CPC ........... *H04B 10/674* (2013.01); *H04B 10/40* (2013.01)

(58) Field of Classification Search
CPC .............................. H04B 10/674; H04B 10/40
See application file for complete search history.

(56) References Cited

U.S. PATENT DOCUMENTS

2009/0015456 A1* 1/2009 Moore ................... H01Q 1/526
342/4
2012/0252256 A1* 10/2012 Zhu ................... H01R 13/6271
439/357

2012/0315051 A1* 12/2012 Oomori ................ G02B 6/4277
398/135
2016/0266340 A1 9/2016 Zhang et al.
2017/0160502 A1* 6/2017 Zhao .................... G02B 6/4277
2019/0011655 A1* 1/2019 Hino .................... G02B 6/4261
2019/0101714 A1 4/2019 Kurashima et al.
2019/0219781 A1 7/2019 Kurashima et al.
2020/0045808 A1 2/2020 Kagaya et al.
2021/0066859 A1 3/2021 Rita et al.

FOREIGN PATENT DOCUMENTS

JP 2013029639 A * 2/2013
JP 2019066675 A 4/2019
JP 2019125662 A 7/2019
JP 2020003797 A 1/2020

* cited by examiner

*Primary Examiner* — Pranesh K Barua
(74) *Attorney, Agent, or Firm* — MATTINGLY & MALUR, PC

(57) ABSTRACT

An optical transceiver includes an attenuation mechanism capable of attenuating the electromagnetic waves in an intermediate space of the interior space. The interior space is continuous in a first direction between the photoelectric device and the optical connector, the interior space being surrounded with a conductive surface from every direction perpendicular to the first direction. The attenuation mechanism is a post structure including some conductive posts electrically continuous to the conductive surface, the conductive posts extending in a second direction perpendicular to the first direction, the conductive posts being arranged at some points in a plan view along the second direction, the points being at vertices of some quadrangles, adjacent quadrangles of which share one side with each other, the quadrangles being arranged in the first direction, the optical fiber passing through at least one adjacent pair of the quadrangles in the first direction.

12 Claims, 16 Drawing Sheets

OPTICAL TRANSCEIVER

CROSS-REFERENCE TO RELATED APPLICATION

The present application claims priority from Japanese patent application JP2022-144326 filed on Sep. 12, 2022, the contents of which are hereby incorporated by reference into this application.

BACKGROUND

1. Field

This disclosure relates to an optical transceiver.

2. Description of the Related Art

Optical transceivers (optical transceiver modules) are widely used for optical fiber transmission (JP2020-3797A, JP2019-125662A, JP2019-66675A, US2009/0015456A1). The optical transceiver is designed to input and output optical signals with an optical connector, as well as input and output electrical signals with an electrical connector, and additionally convert the optical and electrical signals with a photoelectric device.

Undesired electromagnetic waves are generated within the optical transceivers, and it is crucial to effectively suppress their leakage. The optical connector, typically composed of resin, is susceptible to leakage of the undesired electromagnetic waves, necessitating attenuation of electromagnetic waves that propagate towards the optical connector. However, a space is required for the optical fiber to connect the photoelectric device and the optical connector, making it difficult to place an electromagnetic wave shield, such as a metal or a radio wave absorbing material, between them.

SUMMARY

This disclosure aims to suppress leakage of undesired electromagnetic waves.

An optical transceiver includes: an optical connector; a photoelectric device; an optical fiber connecting the optical connector and the photoelectric device; a metal housing containing an interior space in which the optical connector, the photoelectric device, and the optical fiber are contained, and in which electromagnetic waves propagate; and an attenuation mechanism capable of attenuating the electromagnetic waves in an intermediate space, through which the optical fiber passes, of the interior space, the interior space being continuous in a first direction between the photoelectric device and the optical connector, the interior space being surrounded with a conductive surface from every direction perpendicular to the first direction, the attenuation mechanism being one of a post structure and a plate structure, the post structure including some conductive posts electrically continuous to the conductive surface, the conductive posts extending in a second direction perpendicular to the first direction, the conductive posts being arranged at some points in a plan view along the second direction, the points being at vertices of some quadrangles, adjacent quadrangles of which share one side with each other, the quadrangles being arranged in at least the first direction, the optical fiber passing through at least one adjacent pair of the quadrangles in the first direction, the plate structure including some conductive plates electrically continuous to the conductive surface, each of the conductive plates including front and back surfaces oriented in a third direction perpendicular to the first direction and the second direction, the conductive plates being spaced apart and opposed to each other in the third direction, the conductive plates partitioning the intermediate space into some spaces arranged in the third direction, at least one of the spaces being small enough in width in the third direction to impede propagation of electromagnetic waves, the optical fiber passing through the at least one of the spaces.

DETAILED DESCRIPTION

Figure 1:
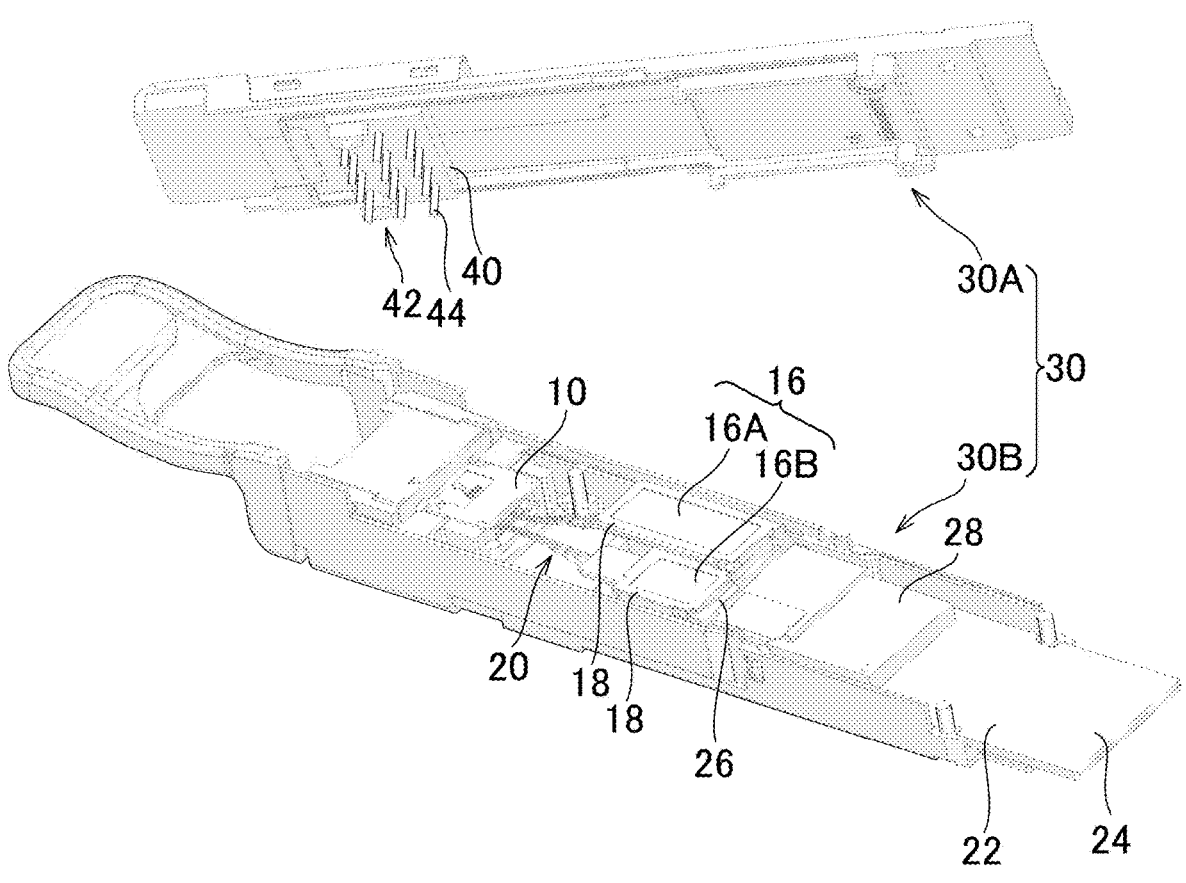
FIG. 1 is an exploded perspective view of an optical transceiver according to a first embodiment.

Hereinafter, some embodiments will be described specifically and in detail with reference to drawings. In all the drawings, the members with the same reference numerals have the identical or same feature and their repetitive description will be omitted. Sizes of figures do not always comply with magnification.

First Embodiment

FIG. 1 is an exploded perspective view of an optical transceiver according to a first embodiment. The optical transceivers (optical transceiver modules) for optical fiber transmission have become faster, smaller, and less expensive with the spread of broadband networks in recent years. Bit rates have increased from 100 Gbit/s to as high as 400 Gbit/s, and 400 Gbit/s optical transceivers, following multi-source agreement (MSA) standards such as QSFP-DD or OSFP, have been advancing in terms of reducing the case volume and minimizing the number of components Network equipment that incorporates the optical transceiver must ensure that the intensity of undesired electromagnetic waves generated by the equipment remains below the limits specified by applicable laws and regulations. In the United States, it is necessary to comply with the limit value of 53.9 dB (μV/m), specified in the FCC Part 15 Subpart B standard (Class B standard, 3-meter distance, frequency range of 1 GHz to 40 GHz), or less.

[Optical Connector]

Figure 2:
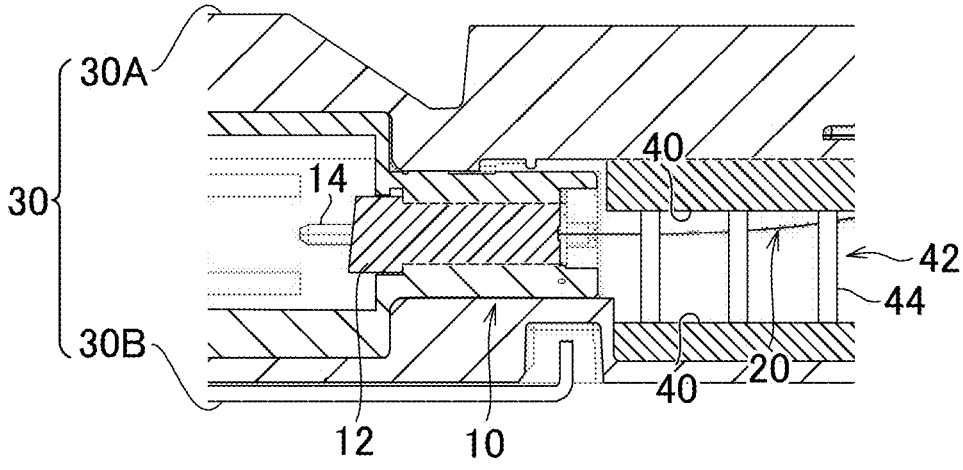
FIG. 2 is a partial cross-sectional view of the optical transceiver according to the first embodiment.

FIG. 2 is a partial cross-sectional view of the optical transceiver according to the first embodiment. The optical transceiver includes an optical connector 10. The optical connector 10 is a multi-fiber push-on (MPO) connector. The optical connector 10 and its mechanically transferable (MT) ferrule 12, which are primarily made of resin, are prone to emitting external electromagnetic radiation. The optical connector 10 includes a guide pin 14.

[Photoelectric Device]

The optical transceiver includes one or more photoelectric devices 16. The photoelectric devices 16 are a transmitter optical subassembly (TOSA) 16A and a receiver optical subassembly (ROSA) 16B. The photoelectric devices 16 are parts of a transceiver circuit in which electromagnetic waves are generated. The frequency of the electromagnetic waves matches the modulation rate of digital modulation signals transmitted by the transceiver circuit. In a 400 Gbit/s optical transceiver, electrical serial data signals are utilized with a modulation rate of 26.56 Gbaud (precisely, 26.5625 Gbaud), resulting in generation of undesired electromagnetic waves at a frequency of 26.56 GHz (precisely, 26.5625 GHz) matching the modulation rate. The positions of the photoelectric devices 16 vary depending on the circuit design. The photoelectric devices 16 are securely mounted using fixing brackets 18.

[Optical Fiber]

The optical transceiver includes one or more optical fibers 20. The optical fibers 20 connect the optical connector 10 and the photoelectric devices 16. The arrangement of the optical fibers 20 should be freely changeable according to the positions of the photoelectric devices 16.

[Printed Circuit Board]

The optical transceiver includes a printed circuit board 22. The printed circuit board 22 is equipped with an electrical connector 24 (e.g., card edge connector) at an end. The printed circuit board 22 includes an unillustrated interconnect pattern, to which the photoelectric devices 16 are electrically connected. A flexible printed circuit board (FPC board) 26 is used for electrical connections. The printed circuit board 22 has an IC 28 (e.g., digital signal processor) mounted on it. Due to noises (e.g., switching noises) originating from the IC 28, undesired electromagnetic waves are generated at a high frequency above 1 GHz. Consequently, implementation of design techniques aimed at minimizing emission of the undesired electromagnetic waves to surroundings brings significant benefits to both network devices and optical transceivers.

In the optical transceiver, a primary excitation source of the undesired electromagnetic waves is the IC 28, which amplifies and outputs the electrical serial data signals (modulation signals). Unlike clock signals, ideally random serial data signals contain no repetitive signal patterns and therefore have no large peak intensity on the frequency spectrum (spectral spreading). However, in an amplification circuit inside the IC 28, switching noises are generated due to nonlinearity of transistors, and when the frequency spectrum of the output signals is observed, a large peak is generated at the frequency matching the modulation rate (or modulation speed, symbol rate). These noises are radiated from the printed circuit board 22 to space and to the surroundings as undesired electromagnetic waves.

[Metal Housing]

The optical transceiver includes a metal housing 30. The metal housing 30 includes an upper casing 30A and a lower casing 30B that are fitted together. At a front of the metal housing 30 is an opening for positioning the optical connector 10, into which the optical connector 10 is secured. An end (electrical connector 24) of the printed circuit board 22 protrudes from an opening at a rear of the metal housing 30 (e.g., lower casing 30B). The metal housing 30 constitutes a waveguide (e.g., rectangular waveguide). An inner surface of the metal housing 30 (waveguide) is a conductive surface.

Figure 3:
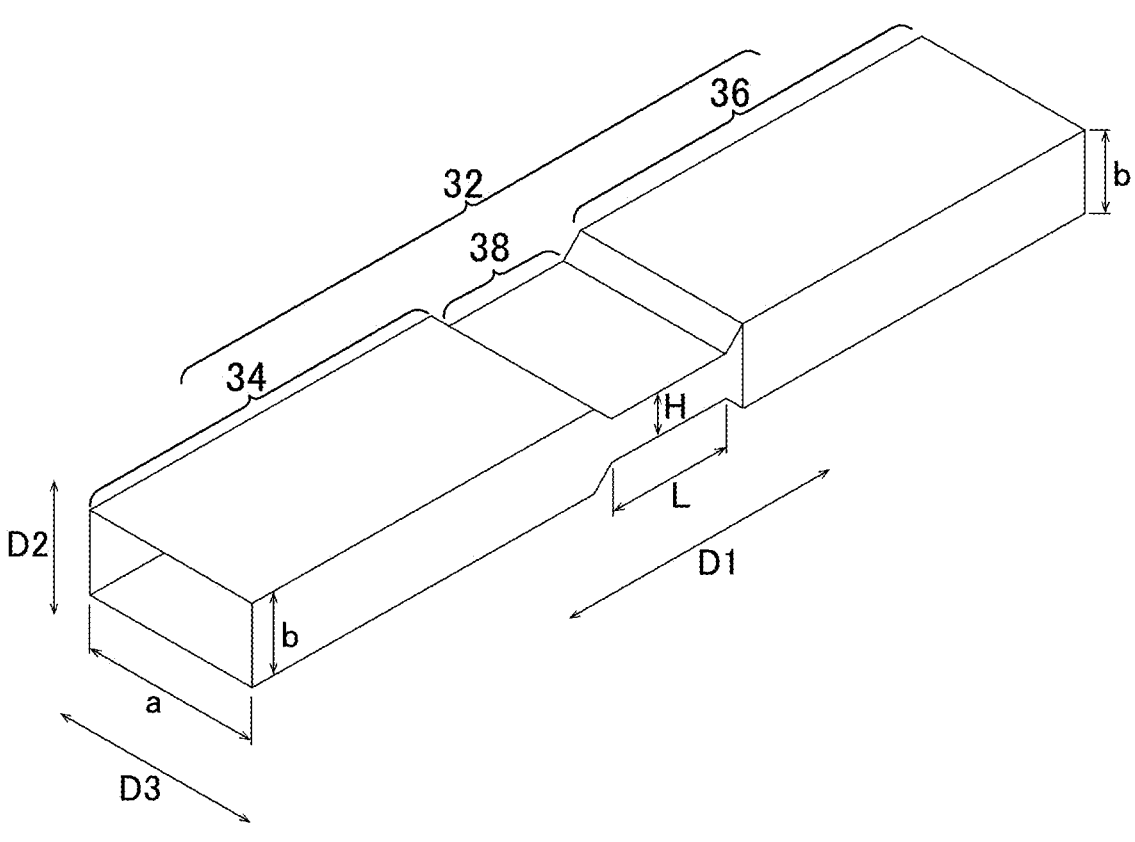
FIG. 3 is a perspective view of a conductive surface of a waveguide simulating a metal housing.

FIG. 3 is a perspective view of a conductive surface of a waveguide simulating the metal housing 30. The metal housing 30 includes an interior space 32 in which the optical connector 10, the photoelectric devices 16, and the optical fibers 20 are contained. The interior space 32 is continuous in the first direction D1 between the photoelectric devices 16 and the optical connector 10. The interior space 32 is surrounded with a conductive surface from every direction perpendicular to the first direction D1. The interior space 32 allows for propagation of the electromagnetic waves. The conductive surface shall have a width (a) of 15.3 mm and a height (b) of 7.0 mm, following QSFP-DD. The waveguide shall be sufficiently long.

The interior space 32 includes a first space 34 in which the optical connector 10 is contained. The interior space 32 includes a second space 36 in which the photoelectric devices 16 are contained. The printed circuit board 22 is located in the second space 36. The edge (electrical connector 24) of the printed circuit board 22 is exposed from the metal housing 30.

The interior space 32 includes an intermediate space 38 through which the optical fibers 20 pass. The intermediate space 38 lies between the first space 34 and the second space 36. As shown in FIG. 2, the conductive surface includes a protrusion 40 protruding into the intermediate space 38 in a second direction D2 (height direction) perpendicular to the first direction D1. Thereby, as shown in FIG. 3, the height H (5 mm or less, more preferably 3.745 mm or less) of the intermediate space 38 is smaller than the height (b) of the first space 34 and the second space 36 in the second direction D2. The height H of the intermediate space 38 is smaller in the second direction D2 than half of the wavelength of the electromagnetic waves propagating in the interior space 32. In contrast, the height (b) (e.g., 7 mm) of the first space 34 and the second space 36 is larger in the second direction D2 than half (5.65 mm) of the wavelength of the electromagnetic waves. The length L of the intermediate space 38 is, for example, 10 mm.

If the frequency of the undesired electromagnetic waves is 26.56 GHz, there are five modes propagating inside the waveguide: TE10 (mode 1), TE20 (mode 2), TE01 (mode 3), TE11 (mode 4), and TM11 (mode 5). In order to block TE01 mode, the height H of the intermediate space 38 must be half or less of the wavelength at least at the frequency of 26.56 GHz.

Based on a theoretical equation, when the height H of the intermediate space 38 is 5 mm, TE01 mode (mode 3) exhibits a cutoff frequency of 30 GHz, effectively suppressing its propagation. However, when the height H is 5 mm, every 1 mm increase in the length L of the intermediate space 38 results in an attenuation of 2.53 dB, indicating need for a relatively lengthy intermediate space 38. By setting the height H of the intermediate space 38 to 3.745 mm, the cutoff frequency of TE01 mode experiences an increase to 40 GHz. By setting the height H to 3.745 mm, the attenuation increases to 5.44 dB for every 1 mm increase in the length L of the intermediate space 38, allowing for effective impedance even with a relatively shorter intermediate space 38.

In order to further suppress leakage of the undesired electromagnetic waves from the optical connector 10, it is advantageous to incorporate a shielding material such as a metal or a radio wave absorbing material in the intermediate space 38 to minimize a gap in vertical and horizontal directions and pass the optical fibers 20 between them or sandwich the optical fibers 20 between them. However, this approach reduces flexibility in arranging the optical fibers 20, poses a challenge in connecting them to the photoelectric devices 16, and complicates assembly processes. Therefore, in this embodiment, the optical transceiver includes an attenuation mechanism 42. This results in impeding the other four modes.

[Attenuation Mechanism]

Figure 4:
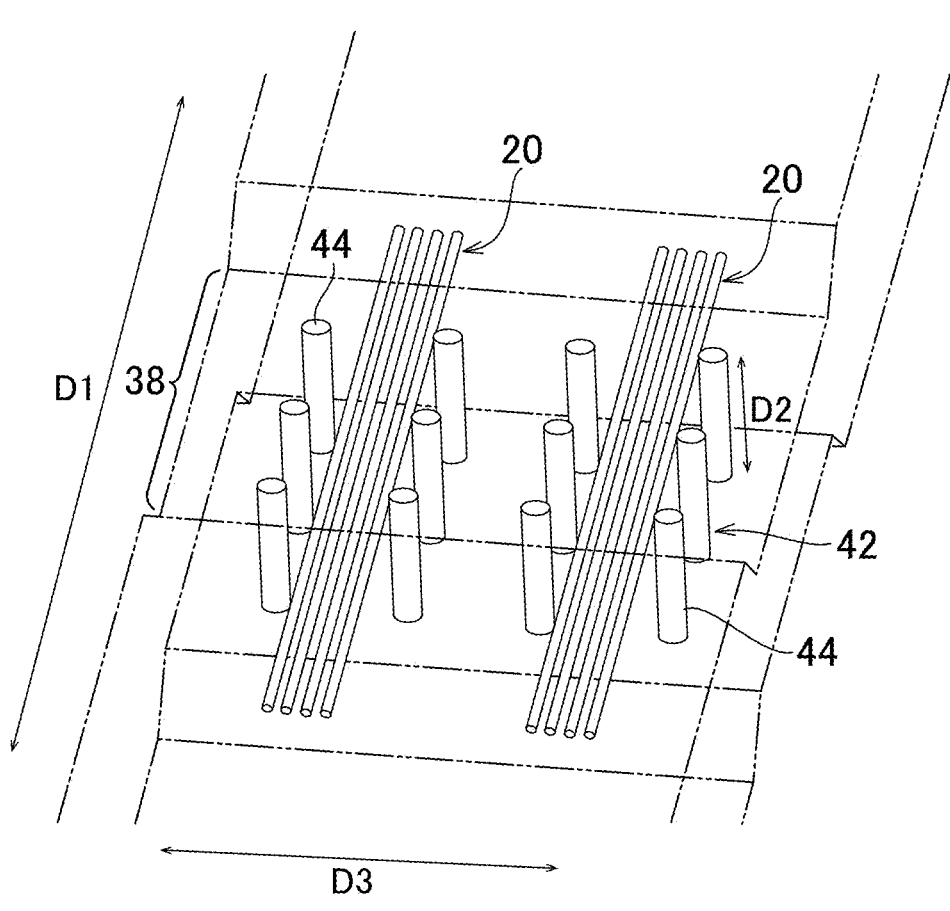
FIG. 4 is a perspective view of an attenuation mechanism and an optical fiber.
Figure 5:
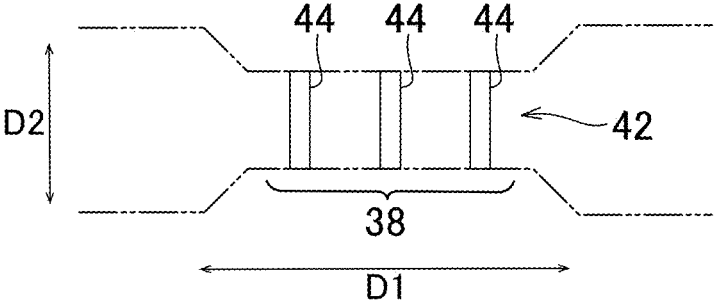
FIG. 5 is a side view of the attenuation mechanism.

FIG. 4 is a perspective view of an attenuation mechanism 42 and an optical fiber 20. FIG. 5 is a side view of the attenuation mechanism 42. The attenuation mechanism 42 is situated within the intermediate space 38 of the interior space 32. The attenuation mechanism 42 is configured to attenuate electromagnetic waves. The attenuation mechanism 42 is a post structure including some conductive posts 44 (e.g., metal posts) that is electrically continuous to a conductive surface. The conductive posts 44 extend in the second direction D2.

Figure 6:
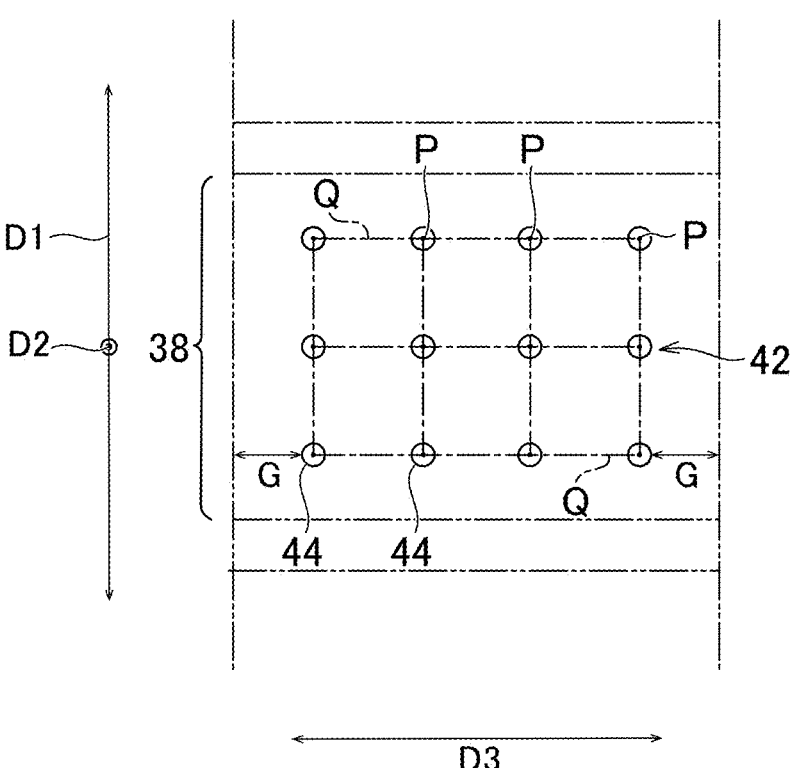
FIG. 6 is a plan view of the attenuation mechanism.

FIG. 6 is a plan view of the attenuation mechanism 42. The conductive posts 44 are arranged at some points P in a plan view along the second direction D2. The points P are arranged in a square grid. The points P are at the vertices of some quadrangles Q, adjacent quadrangles Q of which share one side with each other. Each quadrangle Q is rectangular (e.g., square). The quadrangles Q are arranged at least in the first direction D1 and also in the third direction D3 (width direction), which is perpendicular to the first direction D1 and the second direction D2. At least three conductive posts 44 are arranged in the first direction D1. For example, four conductive posts 44 are arranged in the third direction D3. The gap in the third direction D3 between the attenuation mechanism 42 and the conductive surface is smaller than a length of the one side of each quadrangle Q.

The optical fibers 20 pass through the attenuation mechanism 42. The optical fibers 20 pass through at least one pair, adjacent to each other in the first direction D1, of the quadrangles Q. If conductive wires such as copper wires are used in place of the optical fibers 20 made of a dielectric, a propagation mode (TEM mode) different from the above five modes is generated, and thus a significant impedance effect against the undesired electromagnetic waves as described above cannot be obtained.

[Frequency Dependency]

Figure 7:
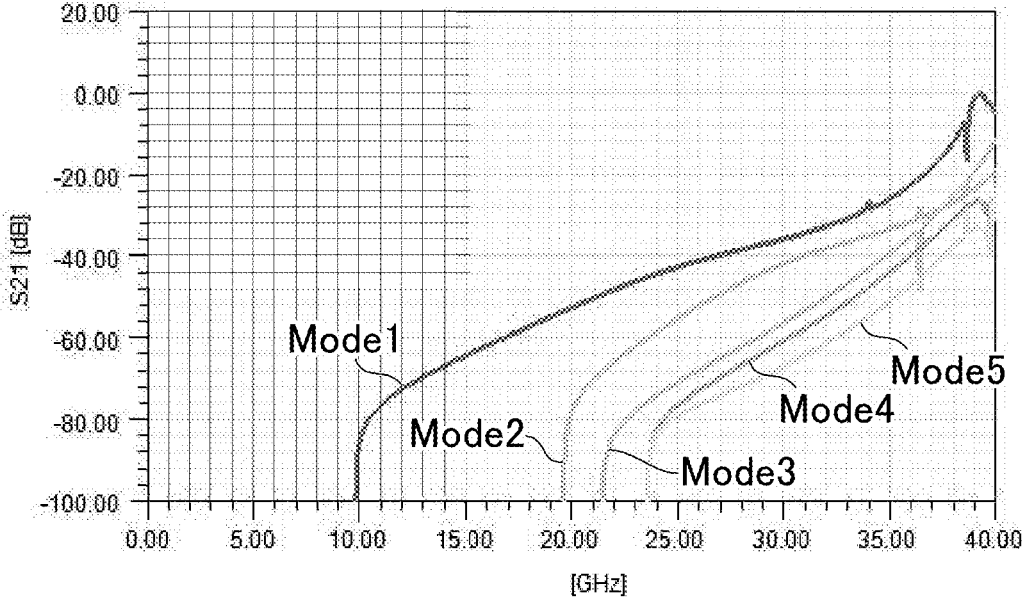
FIG. 7 is a diagram of frequency dependency of a waveguide simulating a metal housing.

FIG. 7 is a diagram of frequency dependency of the waveguide simulating the metal housing 30. The frequency dependency was determined through utilization of a three-dimensional electromagnetic field analysis tool. The height H of the intermediate space 38 was set to 3.745 mm and the length L of the intermediate space 38 was 10 mm. The conductive posts 44 were cylindrical with an outer diameter of 0.75 mm, and the center-to-center distance between the 44 conductive posts was set to 3.36 mm. The distance between the conductive posts 44 was 2.61 mm (3.0 mm or less). The gap G between the conductive posts 44 and the conductive surface is 2.235 mm (3.0 mm or less). At the frequency of 26.56 GHz, the small-signal scattering parameter (S21) exhibits −40 dB or lower, indicating a significant impedance effect against the undesired electromagnetic waves.

An analysis conducted using the three-dimensional electromagnetic field analysis tool, simulating an electromagnetic reverberation chamber (RVC), demonstrated that the undesired electromagnetic waves at the frequency of 26.56 GHz were reduced by approximately 40 dB in the optical transceiver of this embodiment, resulting a significant impedance effect achieved. This result is consistent with the result of the small-signal scattering parameter (S21) in FIG. 7.

According to this embodiment, the intermediate space 38 in the optical transceiver serves to impede the undesired electromagnetic waves while providing sufficient space to accommodate the optical fibers 20, resulting in provision of the optical transceiver that achieves both reduced undesired electromagnetic waves and flexible placement of the optical fibers 20.

[Variant of First Embodiment]

Figure 8:
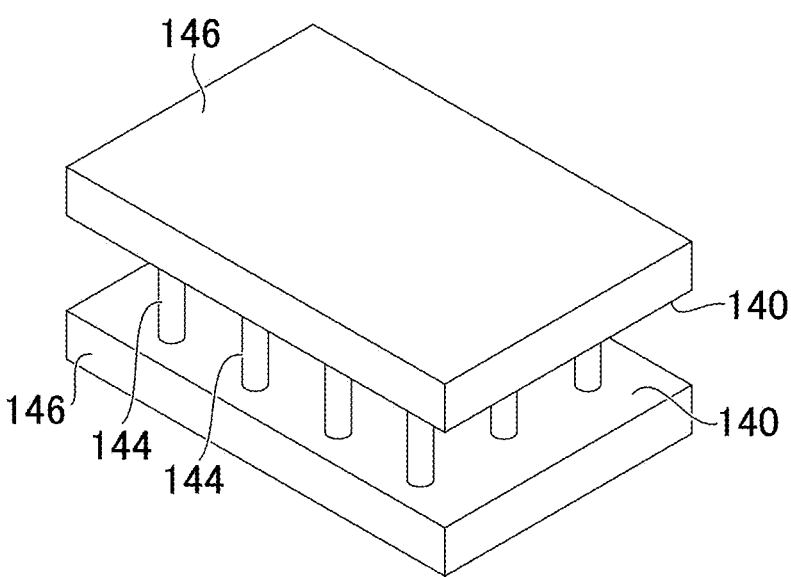
FIG. 8 is a perspective view of a protrusion and an attenuation mechanism according to a variant of the first embodiment.

FIG. 8 is a perspective view of a protrusion and an attenuation mechanism according to a variant of the first embodiment. In this variant, a conductor 146 is attached to the inner surface of the metal housing, with no protrusion, to form the protrusion 140. The conductor 146 may be entirely made of metal, a plating film covering a resin plate, conductive rubber, or conductive non-woven fabric. A conductive adhesive may be used to attach the conductor 146. Some conductive posts 144 lie between a pair of conductors 146. One conductor 146 and the conductive posts 144 can be integrally formed of metal, and another conductor 146 can be formed of conductive rubber or conductive non-woven fabric.

By virtue of the conductor 146 being a distinct component from the metal housing, there is freedom in selecting materials and manufacturing processes, unconstrained by those employed for the metal housing, enabling creation of an affordable, high-quality optical transceiver with an inhibition structure designed to suppress undesired electromagnetic waves.

Second Embodiment

Figure 9:
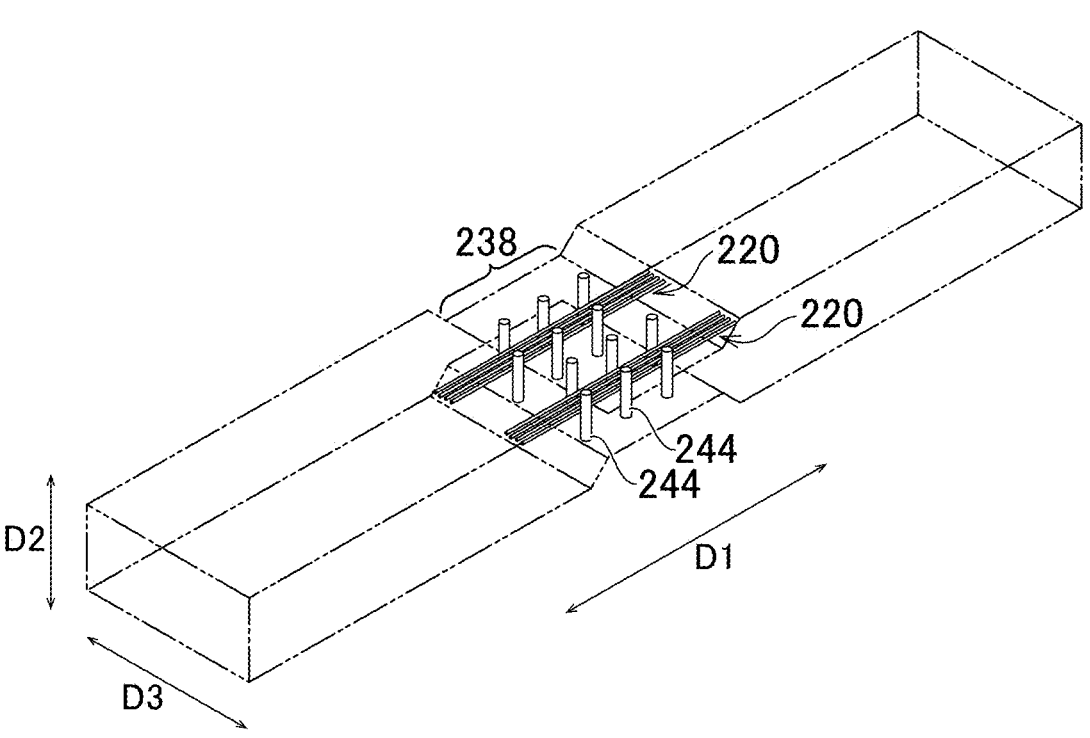
FIG. 9 is a perspective view of conductive posts and an optical fiber of an optical transceiver according to a second embodiment.

FIG. 9 is a perspective view of conductive posts and an optical fiber of an optical transceiver according to a second embodiment. The conductive surface of the waveguide, which simulates the metal housing, is shown by a double-dashed line. This embodiment differs from the first embodiment in arrangement of the 244 conductive posts.

Figure 10:
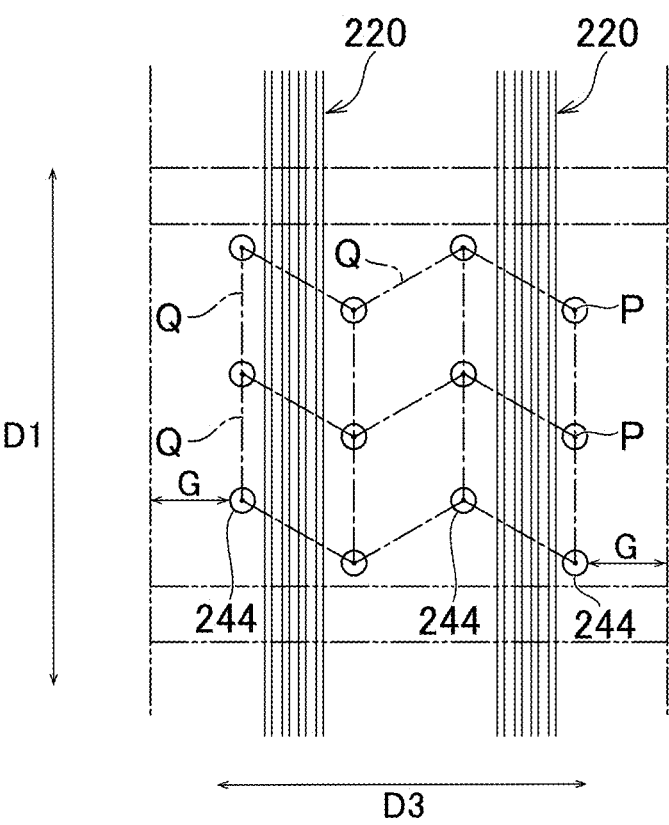
FIG. 10 is a plan view of the conductive posts and the optical fiber.

FIG. 10 is a plan view of the conductive posts 244 and the optical fiber 220. The points P at which the conductive posts 244 are arranged are at the vertices of the quadrangles Q, adjacent quadrangles Q of which share one side with each other. Each quadrangle Q is a parallelogram except for a rectangle, and a pair of opposite sides are parallel to the first direction D1. In other words, the points P are arranged in an equilateral triangular grid. The optical fibers 220 pass through at least one pair (e.g., two pairs) of the quadrangles Q that are adjacent to each other in the first direction D1.

At least three conductive posts 244 are arranged in the first direction D1. Four conductive posts 244, for example, are arranged in a zigzag arrangement in the third direction D3. The conductive posts 244 have a center-to-center distance of 3.73 mm, a spacing of 2.98 mm (3.0 mm or less), and a gap G, between the conductive post 244 and the conductive surface, of about 2.43 mm (3.0 mm or less). The outer diameter of each conductive post 244 and the height and length of the intermediate space 238 are the same as in the first embodiment.

Figure 11:
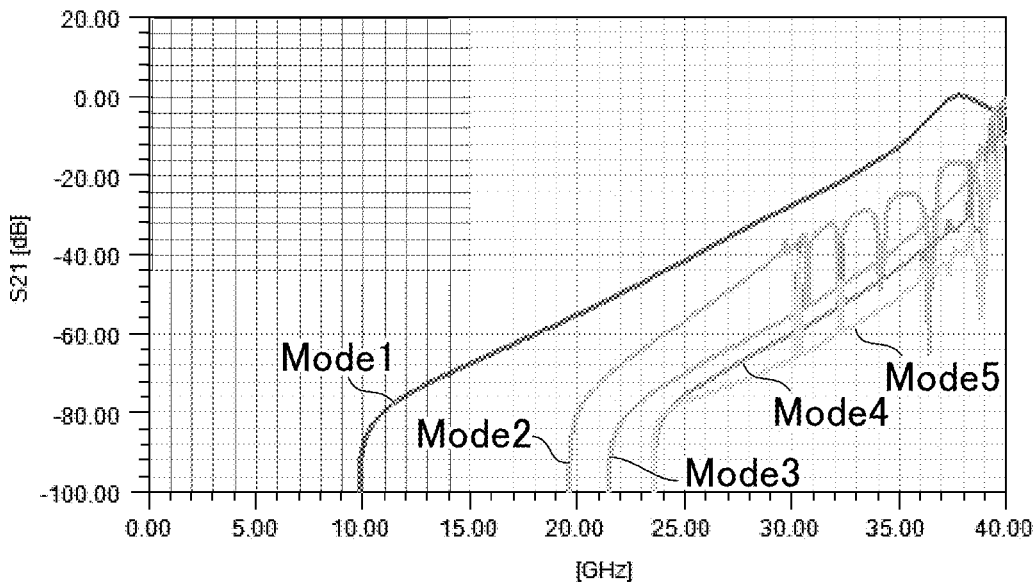
FIG. 11 is a diagram of frequency dependency of a waveguide simulating a metal housing.

FIG. 11 is a diagram of frequency dependency of a waveguide simulating a metal housing. The frequency dependency was determined through utilization of the three-dimensional electromagnetic field analysis tool. At the frequency of 26.56 GHz, the small-signal scattering parameter (S21) exhibits −37 dB or lower, indicating a significant impedance effect against the undesired electromagnetic waves.

Third Embodiment

Figure 12:
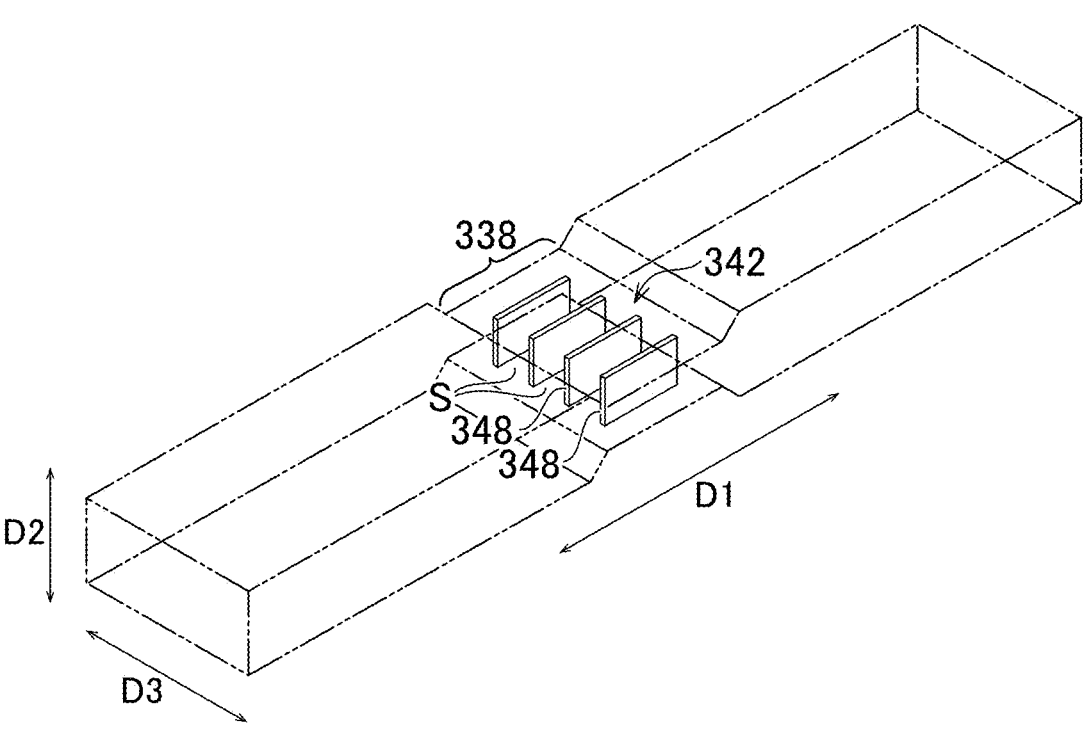
FIG. 12 is a perspective view of an attenuation mechanism of an optical transceiver according to a third embodiment.
Figure 13:
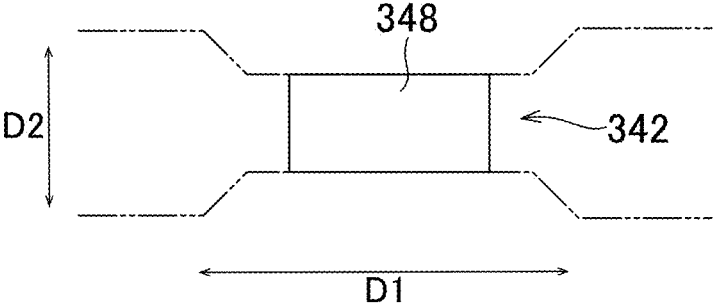
FIG. 13 is a side view of the attenuation mechanism.
Figure 14:
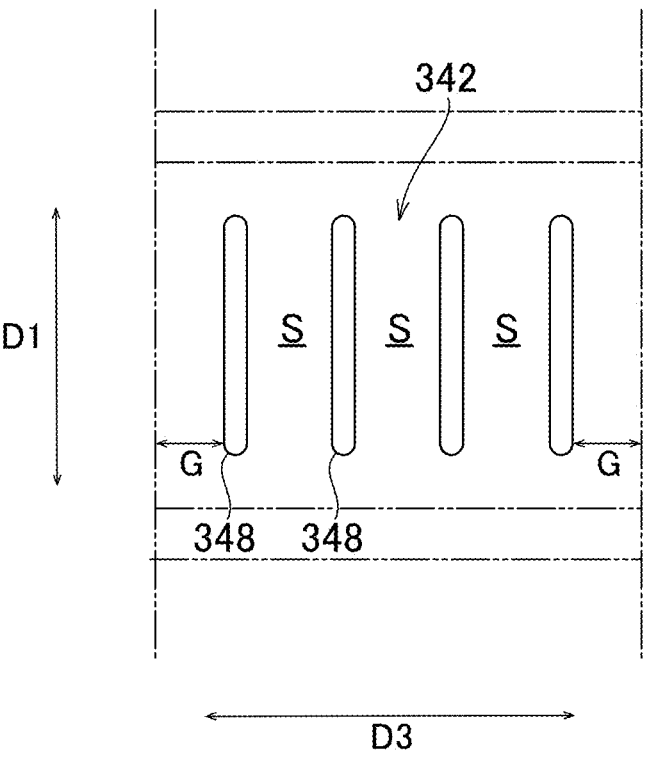
FIG. 14 is a plan view of the attenuation mechanism.

FIG. 12 is a perspective view of an attenuation mechanism of an optical transceiver according to a third embodiment. The conductive surface of the waveguide, which simulates a metal housing, is shown by a double-dashed line. FIG. 13 is a side view of the attenuation mechanism. FIG. 14 is a plan view of the attenuation mechanism.

The attenuation mechanism 342 is a plate structure including some conductive plates 348 that are electrically continuous to the conductive surface. The conductive plates 348 are arranged such that each includes front and back surfaces oriented in the third direction D3 perpendicular to the first direction D1 and the second direction D2. The conductive plates 348 are spaced apart and opposed to each other in the third direction D3. The conductive plates 348 partition the intermediate space 338 into some spaces S arranged in the third direction D3. At least one of the spaces S is small enough in width in the third direction D3 to impede propagation of the electromagnetic waves. The optical fibers pass through the at least one of the spaces S. The gap G in the third direction D3 between the attenuation mechanism 342 and the conductive surface is smaller than the spacing between the conductive plates 348.

The conductive plate 348 had a thickness of 0.75 mm and a length of 7.22 mm. The center-to-center distance between the conductive plates 348 was 3.73 mm, and the spacing was 2.98 mm (3.0 mm or less). The gap G between the conductive plates 348 and the conductive surface was approximately 2.43 mm (3.0 mm or less). The height and length of the intermediate space 338 are the same as in the first embodiment.

Figure 15:
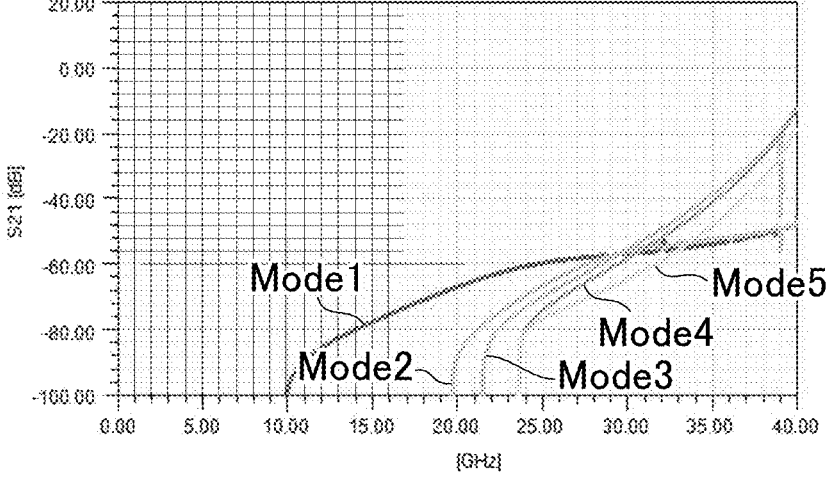
FIG. 15 is a diagram of frequency dependency of a waveguide simulating a metal housing.

FIG. 15 is a diagram of frequency dependency of the waveguide simulating the metal housing. The frequency dependency was determined through utilization of the three-dimensional electromagnetic field analysis tool. At the frequency of 26.56 GHz, the small-signal scattering parameter (S21) exhibits −58 dB or lower, indicating a significant impedance effect against the undesired electromagnetic waves.

An analysis conducted using the three-dimensional electromagnetic field analysis tool, simulating an electromagnetic reverberation chamber (RVC), demonstrated that the undesired electromagnetic waves at the frequency of 26.56 GHz were reduced by approximately 60 dB in the optical transceiver of this embodiment, resulting a significant impedance effect achieved. This result is consistent with the result of the small-signal scattering parameter (S21) in FIG. 15.

[Variant of Third Embodiment]

Figure 16:
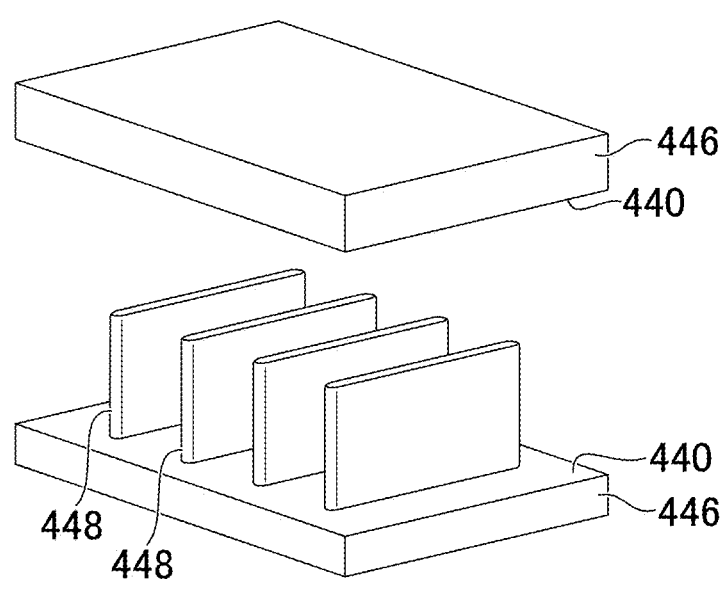
FIG. 16 is a perspective view of a protrusion and an attenuation mechanism according to a variant of the third embodiment.

FIG. 16 is a perspective view of the protrusion and the attenuation mechanism according to a variant of the third embodiment. In this variant, the conductor 446 is attached to the inner surface of the metal housing, with no protrusion, to form the protrusion 440. The conductor 446 may be entirely made of metal, a plating film covering a resin plate, conductive rubber, or conductive non-woven fabric. A conductive adhesive may be used to attach the conductor 446. Alternatively, the conductor 446 and the conductive plates 448 can be formed by folding a conductive non-woven fabric.

[Outline of Embodimets]

(1) An optical transceiver including: an optical connector 10; a photoelectric device 16; an optical fiber 20 connecting the optical connector 10 and the photoelectric device 16; a metal housing 30 containing an interior space 32 in which the optical connector 10, the photoelectric device 16, and the optical fiber 20 are contained, and in which electromagnetic waves propagate; and an attenuation mechanism 42 capable of attenuating the electromagnetic waves in an intermediate space 38, through which the optical fiber 20 passes, of the interior space 32, the interior space 32 being continuous in a first direction D1 between the photoelectric device 16 and the optical connector 10, the interior space 32 being surrounded with a conductive surface from every direction perpendicular to the first direction D1, the attenuation mechanism 42 being one of a post structure and a plate structure, the post structure including some conductive posts 44 electrically continuous to the conductive surface, the conductive posts 44 extending in a second direction D2 perpendicular to the first direction D1, the conductive posts 44 being arranged at some points P in a plan view along the second direction D2, the points P being at vertices of some quadrangles Q, adjacent quadrangles Q of which share one side with each other, the quadrangles Q being arranged in at least the first direction D1, the optical fiber 20 passing through at least one adjacent pair of the quadrangles Q in the first direction D1, the plate structure including some conductive plates 348 electrically continuous to the conductive surface, each of the conductive plates 348 including front and back surfaces oriented in a third direction D3 perpendicular to the first direction D1 and the second direction D2, the conductive plates 348 being spaced apart and opposed to each other in the third direction D3, the conductive plates 348 partitioning the intermediate space 38 into some spaces S arranged in the third direction D3, at least one of the spaces S being small enough in width in the third direction D3 to impede propagation of electromagnetic waves, the optical fiber 20 passing through the at least one of the spaces S.

By employing the attenuation structure 42, the electromagnetic waves can be effectively attenuated, thereby enabling suppression of undesired electromagnetic wave leakage.

(2) The optical transceiver of (1), wherein the photoelectric device 16 is part of a transceiver circuit from which the electromagnetic waves are generated, and a frequency of the electromagnetic waves matches a modulation rate of digital modulation signals transmitted by the transceiver circuit.

(3) The optical transceiver of (1) or (2), wherein the interior space 32 includes a first space 34 in which the optical connector 10 is contained and a second space 36 in which the photoelectric device 16 is contained, and the intermediate space 38 lies between the first space 34 and the second space 36, and is smaller in height in the second direction D2 than the first space 34 and the second space 36.

(4) The optical transceiver of (3), wherein the first space 34 and the second space 36 have heights, in the second direction D2, larger than half of a wavelength of the electromagnetic waves.

(5) The optical transceiver of any one of (1) to (4), wherein the intermediate space 38 has a height, in the second direction D2, smaller than half of a wavelength of the electromagnetic waves.

(6) The optical transceiver of any one of (1) to (5), wherein the attenuation mechanism 42 is the post structure, and the quadrangles Q are arranged in the first direction D1 and the third direction D3.

(7) The optical transceiver of (6), wherein the points P are arranged in a square grid, and each of the quadrangles Q is a rectangle.

(8) The optical transceiver of (6), wherein the points P are arranged in an equilateral triangular grid, each of the quadrangles Q is a parallelogram except for a rectangle, and the parallelogram includes a pair of opposite sides parallel to the first direction D1.

(9) The optical transceiver of any one of (1) to (8), wherein there is a gap G in the third direction D3 between the attenuation mechanism 342 and the conductive surface, the gap G being smaller than a length of one side of each of the quadrangles Q and smaller than a spacing between the conductive plates 348.

(10) The optical transceiver of any one of (1) to (9), wherein the conductive surface includes a protrusion 40 protruding in the intermediate space 38 in the second direction D2.

(11) The optical transceiver of (10), wherein the protrusion 140 is made of a conductor 146 attached to the conductive surface.

(12) The optical transceiver of any one of (1) to (11), further including: a printed circuit board 22 in the second space 36, the printed circuit board 22 including an end exposed from the metal housing 30; and an electrical connector 24 on the end of the printed circuit board 22.

What is claimed is:

1. An optical transceiver comprising:
an optical connector;
a photoelectric device;
an optical fiber connecting the optical connector and the photoelectric device;
a metal housing containing an interior space in which the optical connector, the photoelectric device, and the optical fiber are contained, and in which electromagnetic waves propagate; and
an attenuation mechanism capable of attenuating the electromagnetic waves in an intermediate space, through which the optical fiber passes, of the interior space,
the interior space being continuous in a first direction between the photoelectric device and the optical connector, the interior space being surrounded with a conductive surface from a plurality of directions perpendicular to the first direction, the plurality of directions including a second direction and a third direction that are perpendicular to each other,
the attenuation mechanism being one of a post structure and a plate structure,
the post structure including a plurality of conductive posts electrically continuous to the conductive surface, the conductive posts extending in the second direction, the conductive posts being arranged at a plurality of points in a plan view along the second direction, the points being at vertices of some quadrangles, adjacent quadrangles of which share one side with each other, the quadrangles being arranged in at least the first direction, the optical fiber passing through at least one adjacent pair of the quadrangles in the first direction,
the plate structure including a plurality of conductive plates electrically continuous to the conductive surface, each of the conductive plates including front and back surfaces oriented in the third direction, the conductive plates being spaced apart and opposed to each other in the third direction, the conductive plates partitioning the intermediate space into a plurality of spaces arranged in the third direction, at least one of the spaces having a width in the third direction that provides impedance to propagation of electromagnetic waves, the optical fiber passing through the at least one of the spaces.

2. The optical transceiver of claim 1, wherein
the photoelectric device is part of a transceiver circuit from which the electromagnetic waves are generated, and
a frequency of the electromagnetic waves matches a modulation rate of digital modulation signals transmitted by the transceiver circuit.

3. The optical transceiver of claim 1, wherein
the interior space includes a first space in which the optical connector is contained and a second space in which the photoelectric device is contained, and
the intermediate space lies between the first space and the second space, and is smaller in height in the second direction than the first space and the second space.

4. The optical transceiver of claim 3, wherein the first space and the second space have heights, in the second direction, larger than half of a wavelength of the electromagnetic waves.

5. The optical transceiver of claim 1, wherein the intermediate space has a height, in the second direction, smaller than half of a wavelength of the electromagnetic waves.

6. The optical transceiver of claim 1, wherein
the attenuation mechanism is the post structure, and
the quadrangles are arranged in the first direction and the third direction.

7. The optical transceiver of claim 6, wherein
the points are arranged in a square grid, and
each of the quadrangles is a rectangle.

8. The optical transceiver of claim 6, wherein
the points are arranged in an equilateral triangular grid,
each of the quadrangles is a parallelogram except for a rectangle, and
the parallelogram includes a pair of opposite sides parallel to the first direction.

9. The optical transceiver of claim 1, wherein there is a gap in the third direction between the attenuation mechanism and the conductive surface, the gap being smaller than a length of one side of each of the quadrangles and smaller than a spacing between the conductive plates.

10. The optical transceiver of claim 1, wherein the conductive surface includes a protrusion protruding in the intermediate space in the second direction.

11. The optical transceiver of claim 10, wherein the protrusion is made of a conductor attached to the conductive surface.

12. The optical transceiver of claim 1, further comprising:
a printed circuit board in the second space, the printed circuit board including an end exposed from the metal housing; and an electrical connector on the end of the printed circuit
board.

* * * * *